Patented Sept. 26, 1950

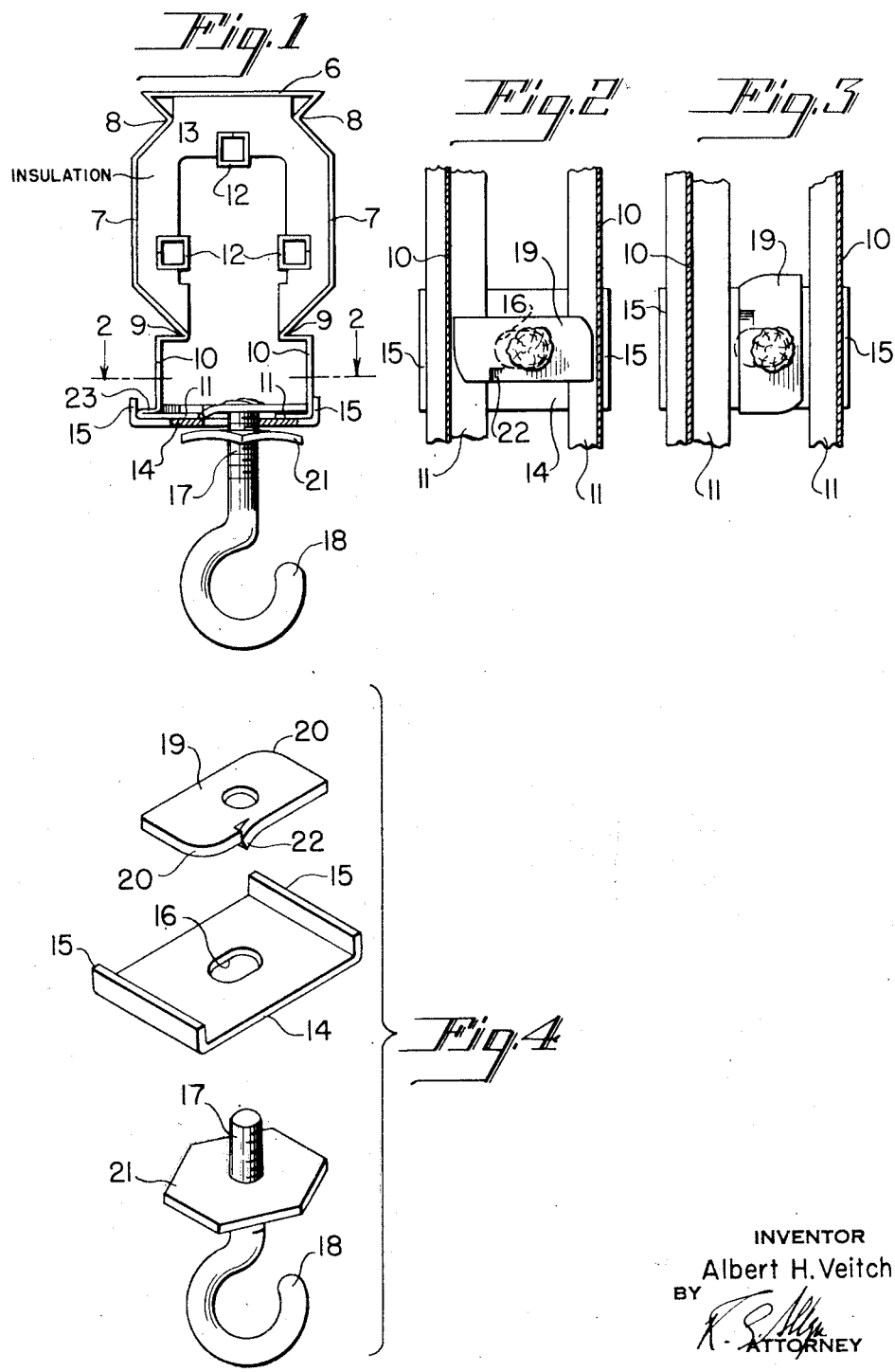

2,523,888

UNITED STATES PATENT OFFICE 2,523,888

CLAMP AND FIXTURE SUPPORT FOR A BUS DUCT SYSTEM OF POWER DISTRIBUTION

Albert H. Veitch, Plainville, Conn., assignor to The Trumbull Electric Manufacturing Company, Plainville, Conn., a corporation of Connecticut Application January 29, 1949, Serial No. 73,493

3 Claims. (Cl. 174—99)

The invention relates to attachments for duct systems of the character in which the duct is formed of sheet metal closed at the top and open between flanges along the lower edge to permit access to the bus bars supported by insulation within the duct. Such ducts are sometimes subjected to considerable mechanical loads as for instance by pulls on collector plugs or trolleys or from articles, such as lamps, suspended from the lower edge.

I accordingly provide a clamp for attachment to the lower face of the duct by which the duct is reinforced and prevented from spreading and which may have a supporting hook or eye which also serves as a handle for carrying and actuating the clamp.

Fig. 1 is an end view of a duct section and showing in partial section the clamp in place.

Fig. 2 is a plan and partial section on the plane of the line 2—2 of Fig. 1.

Fig. 3 is a plan and partial section on the same plane but with the clamp released.

Fig. 4 is a drop perspective view of the parts of the clamp.

In the form shown in Fig. 1, the duct is formed of a single length of metal drawn, rolled or otherwise shaped and has a top 6, sides 7, 7, indented shoulders 8, 8 and 9, 9, channel walls 10, 10 and inturned flanges 11, 11 which form what may be called a slotted bottom or lower face.

The bus bars such as 12, 12, 12 are supported at intervals by U-shaped insulating plates 13 which are held between the shoulders 10, 10 and 11, 11.

The clamp has a plate 14 with side flanges 15, 15 which overlap the lower side walls of the duct and a slot 16 through which the stem 17 of the hook 18 extends. A cross bar 19 is fixed to the upper end of the stem so as to turn with it. This cross bar is narrow enough to permit it to be inserted between the flanges 11, 11 as shown in Fig. 3 and long enough to span the flanges when turned to the position of Figs. 1 and 2.

The corners 20, 20 of the cross bar are preferably rounded off to permit the use of a cross bar of maximum length when the cross bar is turned from the position of Fig. 3 to that of Fig. 2 so that the cross bar can be wedged between the side walls of the duct.

When the cross bar is in place, the nut 21 is screwed up tight beneath the plate 14 to hold the cross bar in place. The cross bar is preferably provided with a projection 22 which projects into the plane of the flange 11 when the nut is tightened so as to prevent accidental release.

The hook serves as a handle for the clamp.

Such an attachment greatly reinforces the duct and reinforces the insulators and affords a convenient means for supporting a load.

To release the clamp, the nut 21 is loosened and the cross bar lifted enough to retract the projection 22 from the edge of the flange 11 whereupon the cross bar can be turned clockwise as viewed in Fig. 2.

Where the duct has an outside flange 23, the plate should be slotted as shown to permit the stem to adjust itself to the eccentricity of the duct.

The slot 16 facilitates application of the clamp to ducts in which the slot between the flanges 11, 11 is offset from the center of the lower face of the duct.

I claim:

1. A clamp for attachment to a U-shaped bus duct comprising a plate having side flanges for overlapping the sides of a duct, a cross bar for insertion into the duct having cam like portions for spreading the sides of the duct and a projection on the bar adapted to engage a portion of the duct for preventing rotation of the cross bar in the duct, a screw-threaded stem fixed to the cross bar by which the cross bar can be rotated except when rotation is prevented by said projection and a member having a screw-threaded connection with said stem for moving said plate toward said cross bar.

2. The combination of a U-shaped bus duct having inwardly projecting flanges spaced apart to leave a slot for the insertion of a collector plug behind the flanges and an attachment including a plate having flanges overlapping the sides of the duct outside of said duct flanges and a cross bar rotatably mounted in said duct for engagement with the inwardly projecting flanges of said duct, said cross bar being narrow enough to permit insertion through said slot and long enough to forcibly spread the sides of the duct when said cross bar is rotated to span said inwardly projecting flanges, a handle connected to said bar for rotating the same, and a projection on one edge of the bar adapted to engage a duct flange to prevent accidental displacement of the bar.

3. The combination with a U-shaped bus duct having inturned flanged edges with an entrance slot therebetween, of an attachment for suspending a fixture from the duct comprising a plate member having flanges on its ends adapted to embrace the outer surfaces of the side walls of the duct and having a central opening adapted to register with the slot in the duct, a screw threaded stem extending loosely through the opening in the plate and into the duct, a bar fixed to the inner end of the stem and extending on both sides thereof, said bar being sufficiently narrow to pass through the slot in the duct to the inside of the duct and sufficiently long to span the slot and to rest on the inner surfaces of the duct flanges, a handle on the outer end of the stem for manipulating said bar, said handle being shaped to support a fixture, a nut on the stem outside of said plate for clamping the duct flanges between the plate and bar, and a projection on one edge of the bar for engaging the free edge of one of the duct flanges to prevent accidental displacement of the bar after the parts are clamped.

ALBERT H. VEITCH.

REFERENCES CITED

The following references are of record in the file of this patent:

UNITED STATES PATENTS

| Number | Name | Date |
| --- | --- | --- |
| 282,010 | Putnam | July 24, 1883 |
| 299,992 | Magner | June 10, 1884 |